(12) United States Patent
Axelrod et al.

(10) Patent No.: US 6,916,497 B2
(45) Date of Patent: Jul. 12, 2005

(54) HEALTH CHEW TOY

(75) Inventors: Glen S. Axelrod, Colts Neck, NJ (US); Ajay Gajria, Monmouth Junction, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 8 days.

(21) Appl. No.: 10/469,107

(22) PCT Filed: Feb. 25, 2002

(86) PCT No.: PCT/US02/05513

§ 371 (c)(1),
(2), (4) Date: Feb. 23, 2004

(87) PCT Pub. No.: WO02/067697

PCT Pub. Date: Sep. 6, 2002

(65) Prior Publication Data

US 2004/0131732 A1 Jul. 8, 2004

Related U.S. Application Data

(63) Continuation of application No. 09/793,799, filed on Feb. 23, 2001, now Pat. No. 6,586,027.

(51) Int. Cl.⁷ .............................................. A01K 29/00
(52) U.S. Cl. ........................... 426/132; 426/72; 426/74; 426/635; 426/805
(58) Field of Search ............................ 426/72, 74, 132, 426/635, 805, 420

(56) References Cited

U.S. PATENT DOCUMENTS

| | | | |
|---|---|---|---|
| 3,296,094 A | * 1/1967 | Cayle | 426/63 |
| 3,883,672 A | 5/1975 | Bone et al. | 426/311 |
| 4,055,681 A | 10/1977 | Balaz et al. | 426/656 |
| 4,145,447 A | 3/1979 | Fisher et al. | 426/72 |
| 4,364,925 A | 12/1982 | Fisher | 424/50 |
| 5,000,973 A | 3/1991 | Scaglione et al. | 426/549 |
| 5,200,212 A | 4/1993 | Axelrod | 426/2 |
| 5,240,720 A | 8/1993 | Axelrod | 426/2 |
| 5,339,771 A | 8/1994 | Axelrod | 119/710 |
| 5,407,661 A | 4/1995 | Simone et al. | 424/49 |
| 5,419,283 A | 5/1995 | Leo | 119/709 |
| 5,476,069 A | 12/1995 | Axelrod | 119/709 |
| 5,635,237 A | 6/1997 | Greenberg et al. | 426/646 |
| 5,827,565 A | 10/1998 | Axelrod | 426/623 |
| 5,922,692 A | 7/1999 | Marino | 514/54 |
| 5,941,197 A | 8/1999 | Axelrod | 119/710 |
| 5,989,604 A | 11/1999 | Wolf et al. | 426/103 |
| 6,056,991 A | 5/2000 | Axelrod | 426/644 |
| 6,067,941 A | 5/2000 | Axelrod | 119/707 |
| 6,086,940 A | 7/2000 | Axelrod | 426/623 |
| 6,093,427 A | 7/2000 | Axelrod | 426/104 |
| 6,093,441 A | 7/2000 | Axelrod | 426/632 |
| 6,110,521 A | 8/2000 | Axelrod | 426/549 |
| 6,126,978 A | 10/2000 | Axelrod | 426/285 |
| 6,159,516 A | 12/2000 | Axelrod et al. | 426/456 |
| 6,165,474 A | 12/2000 | Frudakis et al. | 424/195.1 |
| 6,178,922 B1 | 1/2001 | Denesuk et al. | 119/710 |
| 6,180,161 B1 | 1/2001 | Axelrod | 426/623 |
| 6,274,182 B1 | 8/2001 | Axelrod et al. | 426/132 |

* cited by examiner

*Primary Examiner*—C. Sayala
(74) *Attorney, Agent, or Firm*—Grossman, Tucker, Perreauylt & Pfleger, PLLC

(57) ABSTRACT

A vitamin and/or mineral and/or herbal enriched molded animal chew toy. The vitamins, minerals and/or herbal additives are incorporated into the molded chew toy under conditions that minimize thermal degradation of such additives. Suitable resins include starch, casein, denatured and partially hydrolized casein, thermoplastic polymers and mixtures thereof. In related embodiment, animal chews comprising primarily denatured and partially hydrolized collagen are disclosed, as well as such denatured and partially hydrolized collagen in mixture with vegetable matter, rawhide, animal meal, peanut bits/flour, casein, starch and mixtures thereof.

15 Claims, No Drawings

HEALTH CHEW TOY

CROSS REFERENCE TO RELATED APPLICATION

This application is a U.S. National Stage of International Application No. PCT/US02/05513 (WO 02/067697) filed Feb. 25, 2002, which is a continuation of U.S. application Ser. No. 09/793,799, filed Feb. 23, 2001, now U.S. Pat. No. 6,586,027.

FIELD OF THE INVENTION

The present invention relates to animal chews for dogs, cats and other related animals, and more particularly, to a molded, completely digestible, nutritious animal chew, which is uniquely enriched with vitamins, minerals and/or herb additives to facilitate the delivery of such ingredients to the animal through the chewing process. Such additives may be incorporated within starch, casein, protein/colloids and various other polymer resins.

BRIEF DESCRIPTION OF THE PRIOR ART

A variety of disclosures exist pertaining to the development of edible dog chews that are digestible, nutritious along with a texture that can be individually adjusted to suit a wide variety of a dog's preferences or needs. Attention is therefore directed to the following exemplary disclosures: U.S. Pat. Nos. 6,180,161 "Heat Modifiable Edible Dog Chew; U.S. Pat. No. 6,159,516 "Method of Molding Edible Starch; U.S. Pat. No. 6,126,978 "Edible Dog Chew"; U.S. Pat. No. 6,110,521 "Wheat and Casein Dog Chew with Modifiable Texture"; U.S. Pat. No. 6,093,441 "Heat Modifiable Peanut Dog Chew"; U.S. Pat. No. 6,093,427 "Vegetable Based Dog Chew"; U.S. Pat. No. 6,086,940 "High Starch Content Dog Chew"; U.S. Pat. No. 6,067,941 "Animal Chew"; U.S. Pat. No. 6,056,991 "Turkey and Rice Dog Chew With Modifiable Texture"; U.S. Pat. No. 5,941,197 "Carrot Based Dog Chew"; U.S. Pat. No. 5,827,565 "Process for Making an Edible Dog Chew"; U.S. Pat. No. 5,339,771 "Animal Chew Toy Containing Animal Meal; U.S. Pat. No. 5,240,720 "Dog Chew with Modifiable Texture"; U.S. Pat. No. 5,200,212 "Dog Chew with Modifiable Texture". Attention is also directed to U.S. Pat. No. 6,165,474 entitled "Application for Patent for Nutriceutical Toy" and U.S. Pat. No. 5,419,283 entitled "Animal Chew Toy of Starch Material and Degradable Ethylene Copolymer".

While the above certainly contribute to the body of chew products available to an animal, there is nonetheless a need to improve on the above, particularly with respect to the delivery of vitamins and/or minerals and/or herbs to the animal to ensure complete and balanced nutrition.

In that context it is worth nothing that although nutritional diseases are not commonly seen in dogs and cats fed good-quality commercial rations, there still exists a need to make certain that such animals are provided with the appropriate overall vitamin and mineral supplements to insure proper health. For example, even with certain commercial rations, dogs may suffer from arthritis, in which case a glucosamine supplement may be useful. Furthermore, there have been reports of malnutrition in dogs and cats fed "natural", "organic" or "vegetarian" diets developed by their owners, and many published recipes have not been properly balanced using nutrient averages. See, *The Merck Veterinary Manual*, Eight Edition, Merck & Co. 1998, at 1624–1643.

In addition, herbs have been more recently relied upon by humans as a dietary supplement to potentially provide health benefits such as lowering stress, fighting disease and bolstering immunity. To therefore advance health care for animals, there is a need to consider such herbs in a form that is enjoyable for pets to ingest.

Accordingly, one object of the present invention is to provide a molded chew toy for an animal that, apart from providing edible and digestible characteristics, is enriched with vitamins/minerals and/or herbs to ensure that the animal's comprehensive and proper nutritional needs are maintained. In addition, it is also an object of this invention to strategically incorporate the vitamins/minerals and or other types of herbs in the chew toy at those locations that are more commonly chewed upon by the animal in the course of the animal's interaction with the chew toy.

SUMMARY OF THE INVENTION

A vitamin and/or mineral and/or herbal enriched molded animal chew toy. The vitamins, minerals and/or herbal additives are incorporated into the molded chew toy under conditions that minimize thermal degradation of such additives. The chew toy may be formed by combining resin, water and one or a plurality of said vitamins and/or minerals and/or herbs to form a mixture. The resin includes any and all resins that can be made to flow under conditions of elevated temperature and can be molded and cooled into a desired shape. Resins therefore include natural and/or synthetic macromolecules or polymeric type structures, including starch, casein, denatured and partially hydrolyzed collagen, thermoplastic polymers, and mixtures thereof.

In alternative embodiment, the present invention also broadly relates to an animal chew toy comprising denatured and partially hydrolyzed collagen. Such chew may optionally include a mixture of said denatured and partially hydrolyzed collagen with either casein, starch, vegetable matter, rawhide, peanut bits/flour, animal meal and/or any other thermoplastic resin. All of the chew toys herein may optionally include flavorings or food coloring.

DETAILED DESCRIPTION OF THE PREFERRED EMBODIMENTS

The present invention relates to the development of a molded resin based edible chew toy for an animal that is enriched with vitamins/minerals and/or herbs to contribute to the overall nutritional needs/requirements of an animal.

Turning first then to the resin component, preferably, the resin is selected from the group consisting of starch, casein, denatured and partially hydrolyzed collagen, thermoplastic polymers and mixtures thereof. Thermoplastic polymers include polymers such as polyamides and polyurethanes, as well as ethylene copolymers, such as poly(ethylene acrylic acid) and poly(ethylene vinyl alcohol).

By way of representative example, in the case of starch, e.g., the process herein relies upon combining starch with water to form a mixture such that the mixture is suitable for melt processing techniques. In that regard, attention is directed at commonly owned U.S. Pat. No. 6,159,516, whose teachings are incorporated by reference, which discloses a preferred process for forming starch into the molded article herein. The process makes use of melt processing techniques and comprises combining starch and water wherein the water content is in the range of 20.0 to 40.0% by weight with respect to that of said starch, introducing and heating said mixture in an extruder wherein the water content of said product upon discharge from said extruder is less than the water content of said product entering said extruder, and introducing the product to a heated injection molding machine and injection molding and cooling to form said molded article wherein the water content is at or below 20% by weight.

Accordingly in connection with the above preferred process, the vitamins, minerals and/or herbs can be added with the starch and water prior to extrusion, or may optionally be combined with the starch at that point wherein the starch is to be introduced into the injection molding machine for molding. It is therefore worth noting that in the context of the present invention, it has been uniquely appreciated that the vitamins, minerals and/or herb additives herein can be injection molded in the starch/water mixture without thermal degradation of such additives which degradation may attenuate or eliminate their therapeutic effect. In the context of the present invention, it is therefore preferable that at least some portion of the additives remain non-degraded. Those skilled in the art will therefore recognize, that in the case of the additives herein, levels as low as 50 ppm would be suitable.

More preferably however, at least 0.1–50% of the additives remain non-degraded, most preferably at least 75%, even more preferably at least 80–90%, and in the most preferred embodiment, over 90% of the additives are not thermally degraded by the molding process. This approach then allows such additives to be uniquely distributed in the molded chew toy of the present invention and in a preserved state such that their nutritional or therapeutic value is maintained.

Accordingly, by incorporating the aforementioned additives in a starch/water combination, the invention herein expands upon the use of water to promote melt mixing of such additives with the starch without thermal degradation during plastication (softening for use in a melt-processing operation) in either the extrusion or injection molding equipment. Those skilled in the art will therefore recognize that the amount of water can be readily varied as may be necessary to allow for lower melt processing temperatures to insure against additive (vitamin, mineral, herb) thermal degradation. Preferably, however, the level of water upon introduction to the extruder is set at about 20–40% by weight with respect to that of the starch, which emerges from the extruder at a level of about 15–20%, at which point the extrudate is in condition for the last step of injection molding. Following injection molding, the water level may be set to about 5–20% by weight, and more preferably, 5–15%, and in a most preferred embodiment, the water level of the molded product is set to about 11–14%.

Preferably, the molded chew toy of the present invention contains one or more of those vitamins recommended for dogs by the American Association of Feed Control Officials (AAFCO). In the case of dogs, vitamins may comprise A, C, $B_{12}$, D, E, thiamine, riboflavin, panthothenic acid, niacin, pyridoxine, folic acid and choline. In the case of cats, the vitamins may comprise vitamins A, C, $B_{12}$ D, E, and K, thiamine, riboflavin, pyridoxine, niacin, panthothenic acid, folic acid, biotin and choline.

In addition, the molded chew toy of the present invention also comprises minerals. In the case of dogs, the preferred minerals are calcium, phosphorus, potassium, sodium, chloride, magnesium, iron, copper, manganese, zinc, iodine, selenium. However, it is to be noted that other trace minerals have been suggested, such as Co, Mo, Cd, As, Si, V, Ni, Pb and Sn. Furthermore, minerals such as potassium, calcium, phosphorous and magnesium are required in gram amounts/day, whereas iron, zinc, copper, iodine, and selenium are only required in mg or μg/day. The chew toy herein can therefore be modified to reflect a higher or lower concentration of a given mineral, according to nutritional requirements.

Turning next to the herbal component, the herbs herein are preferably selected from the group consisting of St. Johns Wort, Kava Kava, Ginkgo Biloba, Ginseng (Asian or Siberian varieties), Echinacea and mixtures thereof. Other herbs include Catsclaw, Camomile, Golden Seal, Saw Palmetto, Valerina, V. Agnus-Castus, Black Cohosh, Bilberry and Milk Thistle. Herbs may also include aloe, astragalus, burdock, chaomile, chestnut, coriolus, versicolor, couchgrass, crampbark, dandelion root, dong quai, elecampane, evening primrose, eyebright, false unicorn root, feverfew, garlic ginger, goldenseal, gota kola, grape seed extract, green tea, guggulipid, hawthorn, hops, ivy, licorice, milk thistle, misteltoes (American Asian and European varieties), motherwort, oats, osha, passion flower, pumpkin pygeum, red clover, rosemary, sarsparilla, skullcap, saw plametto, stinging nettle, wild indigo, wild yam and yerba mansa. In addition, glucosamines and/or chondroiton can be added to any of the embodiments described herein.

Turning next to a consideration of the incorporation of the vitamins/minerals and/or herb additives of the present invention, it is preferable that such additives are incorporated at the surface of the molded part, so that they are delivered to the animal prior to the animal's loss of interest in the chew toy at issue. In such regard, the present invention contemplates several methods to selectively locate such additives at the surface of the molded product. First, such additives may be selectively concentrated at the surface by a post-molding operation wherein the additives are incorporated into a soaking solution and are allowed to coat and/or penetrate the molded chew toy. Preferably, a water solution containing the vitamins/minerals and/or herbs can be employed.

Alternatively, the present invention contemplates the process of co-injection molding, which allows multiple resins to be injected into one mold to make a single chew toy. In that regard, a starch formulation without vitamins/minerals and/or herbs may serve as the core of the chew toy and a starch formulation with said vitamins/minerals and/or herbs may serve as the outer molded surface. The thickness of either the core or surface can then be varied according to any desired level.

With reference to such technique of co-injection, it can be appreciated that this. uniquely allows for the injection molding of the starch outer layer with additive (vitamin, mineral, herb) under conditions wherein the water level may be higher than that of the core. For example, the outer layer formulation may comprise water levels, prior to injection molding of between 10–20%, preferably 15–20%, wherein the starch/water mixture for the core is made to contain water levels that are lower than any level selected for the outer layer. However, one preferred example is to injection mold the outer layer at a level of between 15–20% water, whereas the inner core is injection molded at levels between 10–15%.

In addition, when the chew toy of the present invention is in the shape of a conventional dog bone, comprising a center and two end portions, those skilled in the art will recognize that dogs typically chew the end or "knuckle" portion of the bone. That being the case, the invention herein contemplates selectively concentrating the vitamins/minerals and/or herbs at the end portion to insure the most efficient delivery of the nutrients to a given animal. This can be preferably accomplished by co-injection or by a the aforementioned post-molding soaking process.

In one particularly preferred process of manufacturing the animal chew toy herein, starch and water are first combined wherein the water content is in the range of 20 to about 40% by weight with respect to that of said starch. The mixture is introduced into a vented barrel extruder to form extruded beads, wherein the water content upon discharge is less than the water content of said mixture entering the extruder. The is followed by introduction of the extruded beads to a heated injection molding machine containing a mold and injection molding and cooling to form the molded article wherein the water content of the molded article is at or below about 20% by weight, wherein the injection molding machine contains a hopper feed section, a barrel and an output nozzle, including a plurality of heating zones in said barrel extending from said hopper section to said nozzle, wherein said plurality of heating zones are set within the following temperature ranges: zone 1=at or below about 70° F.; zone 2=at or below 150° F.; zone 3=at or below about 300° F.; zone 4=at or below about 375° F. Preferably, the mold itself is cooled to about 35–65° F.

In connection with the above, it should be pointed out that the above temperature profile is most conveniently achieved by the use of cooling coils placed about the barrel of the injection molding machine, where such coils comprise copper cooling coils with circulating water. The advantage of such unique temperature profile, therefore, is that thermal degradation of the starch and the nutritional additives noted herein is minimized.

Finally, optional to the present invention, one may incorporate other types of components to the chew toy to increase the animal's attraction and/or improve the cosmetic appearance of the molded product. For example, one may optionally incorporate flavorings at a level of 0.1–5% as well as a food coloring. In addition, one may optionally incorporate calcium carbonate which has been found to increase the hardness of the products produced therefrom. In addition, one may optionally incorporate a humectant such as oat fiber, in the range of 0.1–5.0%.

In alternative invention, the present invention also relates to a chew comprising denatured and partially hydrolyzed collagen. Those skilled in the art will therefore recognize that collagen comprises the basic structural unit tropocollagen, which has a mass of about 285 kdal and consists of three polypeptide chains of about the same size. Such chain is comprised of the amino acids glycine, proline, hydroxyproline and hydroxylysine. The chain composition can depend upon on the type of collagen, i.e., whether or not it is derived from, e.g., skin or cartilage. Any type of collagen source is suitable herein.

Denatured collagen is reference to the fact that the collagen, when subjected to extremes of temperature or acid or alkaline conditions, denatures and separates into three polypeptide chains. The polypeptide is then partially hydrolyzed to a desired molecular weight, and dried or compounded for the application herein.

In preferred embodiment, the denatured and partially hydrolyzed collagen is made available from International Protein Colloids, St. Joseph Mo., and sold under the trademark COLLOID 3920. COLLOID 3920 is available in dry granular form, particle size 20 mesh, of amber color, pH 5.5–6.5 in solution, with a moisture content of between 8–12% (wt.).

In accordance with the present invention, it has been found that it is preferable to mix the denatured and partially hydrolyzed collagen with another resin, such as casein, starch, vegetable matter, animal meal, peanut bits/flour, or a synthetic polymer resin, such as a thermoplastic resin, including polyamides and or polyurethanes, as well as ethylene copolymers, such as poly(ethylene acrylic acid) and/or poly(ethylene vinyl alcohol): In such regard, the mixture has been found to lend itself to melt processing under pressure, which includes extrusion, injection molding and/or compression molding techniques. Accordingly, one can prepare injection molded type chew toys herein, comprising denatured and partially hydrolyzed collagen, as well as molded chew toys that combine such collagen with the various components noted above.

In addition, in the case of such mixtures of denatured and partially hydrolyzed collagen with, e.g., vegetable matter, animal meal, peanut bits/flour, rawhide, casein or starch, it has been found preferable to combine with any one of these components at levels of up to 50%, as well as at any percentage between 0.1–50%. Preferably, and by way of representative example, in the case of a mixture with rawhide, it has been found preferable to incorporate about 25% of the denatured and partially hydrolyzed collagen with rawhide, and in a most preferable form, about 15% of denatured and partially hydrolyzed collagen is mixed with rawhide.

This invention has been set forth in detail, but it should be understood by those skilled in the art that the various examples herein are by way of illustration only. Modifications and variation will therefore be apparent and may be resorted to without departing from the spirit and equivalent scope of this invention. Accordingly, such modifications and equivalents are considered to be within the purview of the scope of the invention as set forth in the following claims.

What is claimed is:

1. An animal chew toy comprising denatured and partially hydrolyzed collagen and meat flavoring.

2. The animal chew toy of claim 1 wherein said collagen is comprises tropocollagen.

3. The animal chew of claim 1 wherein said collagen is comprised of glycine, proline, hydroxyproline and hydroxylysine.

4. The animal chew toy of claim 1 wherein said denatured and partially hydrolyzed collagen comprises a polypeptide.

5. The animal chew toy of claim 1 wherein a flavoring is present in the amount of about 0.1–5%.

6. An animal chew comprising denatured and partially hydrolyzed collagen and vegetables.

7. The animal chew of claim 6 wherein said vegetables comprises spinach, carrots, broccoli, beans, peas and mixtures thereof.

8. The animal chew of claim 6 wherein said denature and partially hydrolyzed collagen is present at a level of about 1–50%.

9. An animal chew comprising denatured and partially hydrolyzed collagen and animal meal.

10. The animal chew of claim 9 wherein said denatured and partially hydrolyzed collagen is present at about 1–50% by weight.

11. The animal chew of claim 9 wherein said animal meal comprises poultry meal, beef meal, horse meal, fish meal or mixtures thereof.

12. An animal chew comprising denatured and partially hydrolyzed collagen and rawhide.

13. The animal chew of claim 12, wherein said denatured and partially hydrolyzed collagen is present at about 1–50% by weight.

14. An animal chew comprising denatured and partially hydrolyzed collagen and peanut bits/flour.

15. The animal chew of claim 14 wherein said denatured and partially hydrolyzed collagen is present at a level of about 1–50%.

* * * * *